United States Patent
Sarafianos et al.

(10) Patent No.: US 11,942,440 B2
(45) Date of Patent: *Mar. 26, 2024

(54) METHOD FOR DETECTING A DIFFERENTIAL FAULT ANALYSIS ATTACK AND A THINNING OF THE SUBSTRATE IN AN INTEGRATED CIRCUIT, AND ASSOCIATED INTEGRATED CIRCUIT

(71) Applicant: STMicroelectronics (Rousset) SAS, Rousset (FR)

(72) Inventors: Alexandre Sarafianos, Pourrieres (FR); Abderrezak Marzaki, Aix en Provence (FR)

(73) Assignee: STMicroelectronics (Rousset) SAS, Rousset (FR)

( * ) Notice: Subject to any disclaimer, the term of this patent is extended or adjusted under 35 U.S.C. 154(b) by 454 days.

This patent is subject to a terminal disclaimer.

(21) Appl. No.: 17/091,466

(22) Filed: Nov. 6, 2020

(65) Prior Publication Data

US 2021/0057358 A1 Feb. 25, 2021

Related U.S. Application Data

(63) Continuation of application No. 16/154,456, filed on Oct. 8, 2018, now Pat. No. 10,892,234.

(30) Foreign Application Priority Data

Oct. 11, 2017 (FR) ...................................... 1759519

(51) Int. Cl.
*H01L 23/00* (2006.01)
*G06F 21/55* (2013.01)
(Continued)

(52) U.S. Cl.
CPC .......... *H01L 23/576* (2013.01); *G06F 21/556* (2013.01); *G06F 21/78* (2013.01);
(Continued)

(58) Field of Classification Search
CPC ............... H01L 23/576; H01L 29/0649; H01L 29/0646; G06F 21/556; G06F 21/78; H04L 9/004; H04L 2209/12
(Continued)

(56) References Cited

U.S. PATENT DOCUMENTS 6,107,107 A * 8/2000 Bruce .................. G01R 31/311
  438/14
7,298,159 B1 * 11/2007 Rozario ............. G01R 31/2623
  324/762.01

(Continued)

FOREIGN PATENT DOCUMENTS

CN 102063584 A 5/2011
CN 105374758 A 3/2016
(Continued)

OTHER PUBLICATIONS

INPI Search Report and Written Opinion for FR 1759519 dated Aug. 29, 2018 (9 pages).
(Continued)

*Primary Examiner* — Badri Narayanan Champakesan
(74) *Attorney, Agent, or Firm* — CROWE & DUNLEVY

(57) ABSTRACT

An integrated circuit includes a semiconductor substrate having a rear face. A first semiconductor well within the substrate includes circuit components. A second semiconductor well within the substrate is insulated from the first semiconductor well and the rest of the substrate. The second semiconductor well provides a detection device that is configurable and designed to detect a DFA attack by fault injection into the integrated circuit.

18 Claims, 7 Drawing Sheets

(51) Int. Cl.
  *G06F 21/78* (2013.01)
  *G06F 21/87* (2013.01)
  *H01L 29/06* (2006.01)
  *H04L 9/00* (2022.01)

(52) U.S. Cl.
  CPC .......... *G06F 21/87* (2013.01); *H01L 29/0646* (2013.01); *H01L 29/0649* (2013.01); *H04L 9/004* (2013.01); *H04L 2209/12* (2013.01)

(58) Field of Classification Search
  USPC ......................................................... 726/34
  See application file for complete search history.

(56) References Cited

U.S. PATENT DOCUMENTS

| | | | | |
|---|---|---|---|---|
| 7,966,666 | B2* | 6/2011 | Walker | G06K 19/073 726/34 |
| 8,946,859 | B2* | 2/2015 | Lisart | H01L 21/763 257/547 |
| 9,121,896 | B2* | 9/2015 | Fornara | G01R 31/2851 |
| 10,109,601 | B2* | 10/2018 | Marzaki | H01L 23/573 |
| 10,379,254 | B2* | 8/2019 | Marzaki | B81B 3/001 |
| 10,453,808 | B2* | 10/2019 | Sarafianos | H01L 23/576 |
| 10,615,086 | B2* | 4/2020 | Sarafianos | H03K 19/00 |
| 2003/0117496 | A1* | 6/2003 | Silverbrook | G06K 19/06037 348/207.2 |
| 2010/0078636 | A1* | 4/2010 | Zachariasse | G06F 21/77 257/48 |
| 2010/0315108 | A1* | 12/2010 | Fornara | H01L 23/576 324/706 |
| 2011/0260749 | A1* | 10/2011 | Deas | G06F 21/556 326/8 |
| 2012/0320477 | A1* | 12/2012 | Lisart | H01L 23/576 361/78 |
| 2012/0320480 | A1* | 12/2012 | Lisart | H01L 23/576 361/88 |
| 2013/0314121 | A1* | 11/2013 | Mougin | H01L 23/576 326/8 |
| 2014/0138686 | A1* | 5/2014 | Wuidart | H01L 22/34 257/48 |
| 2015/0214163 | A1* | 7/2015 | Kuenemund | H01L 23/57 324/76.11 |
| 2017/0244550 | A1* | 8/2017 | Wurcker | H04L 9/3247 |
| 2018/0089426 | A1* | 3/2018 | Shi | G06F 21/755 |
| 2019/0081011 | A1* | 3/2019 | Sarafianos | H01L 29/0649 |

FOREIGN PATENT DOCUMENTS

| | | |
|---|---|---|
| CN | 206259348 U | 6/2017 |
| CN | 209045528 U | 6/2019 |
| DE | 102015118144 A1 | 4/2017 |
| EP | 3159872 A1 | 4/2017 |
| EP | 3236496 A1 | 10/2017 |

OTHER PUBLICATIONS

Makki, Rafic Z., et al: "Transient Power Supply Current Testing of Digital CMOS Circuits," International Test Conference, IEEE, 1995 (10 pages).
First Office Action and Search Report for family-related CN Appl. No. 201811180294.5, report dated May 31, 2022, 6 pgs.

* cited by examiner

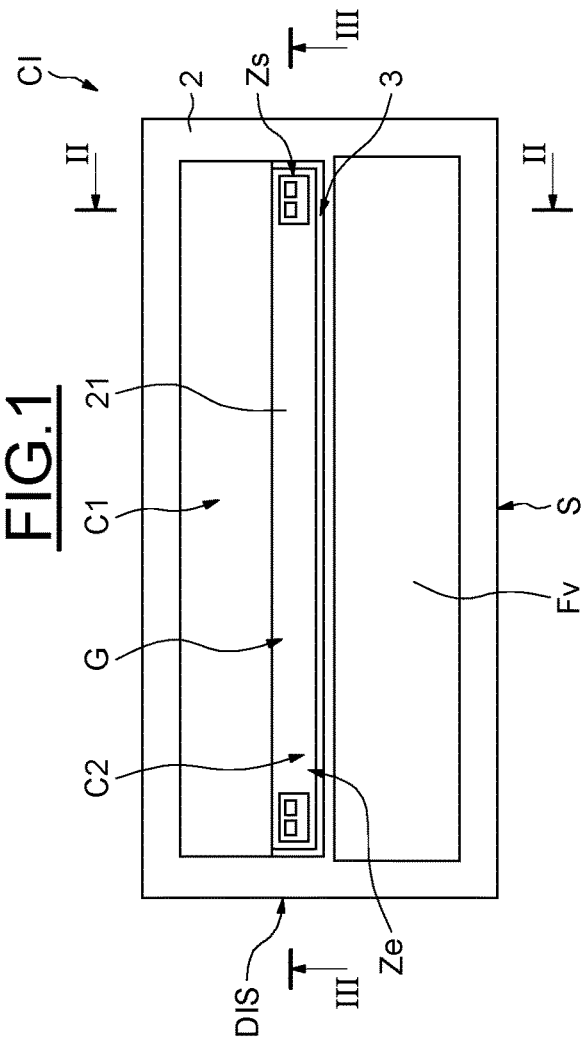
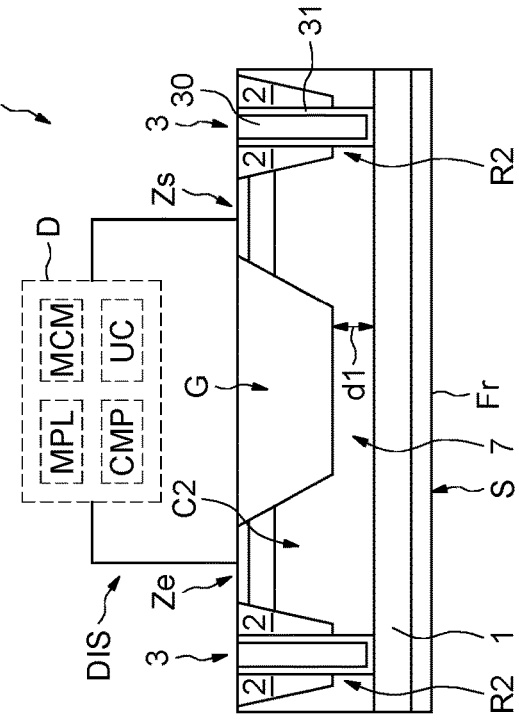
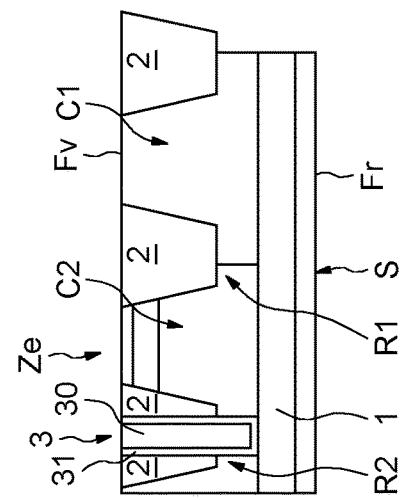

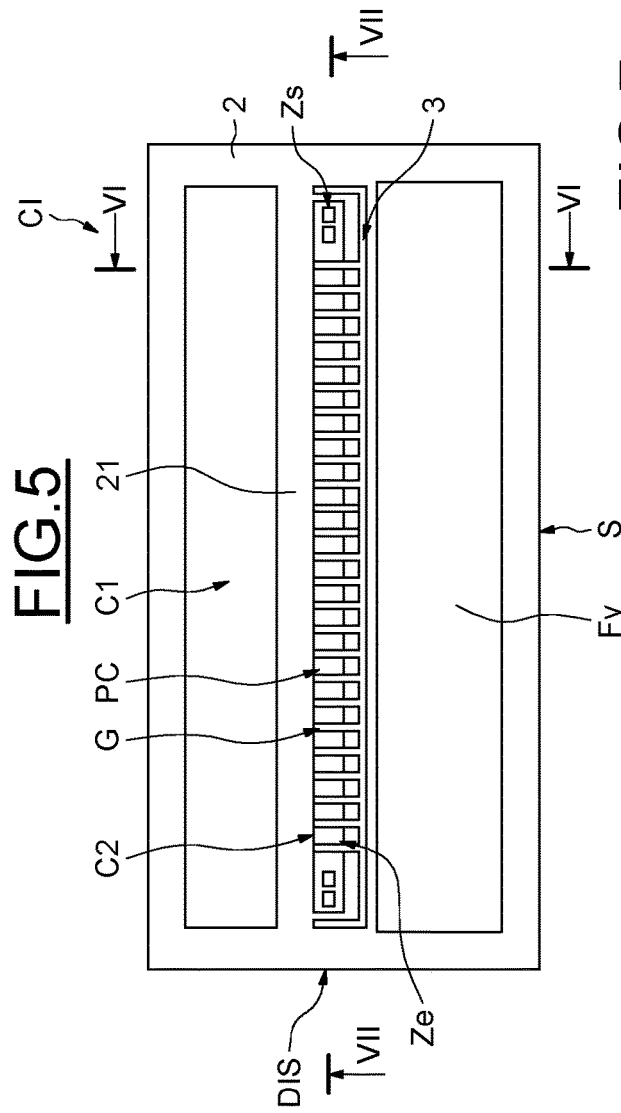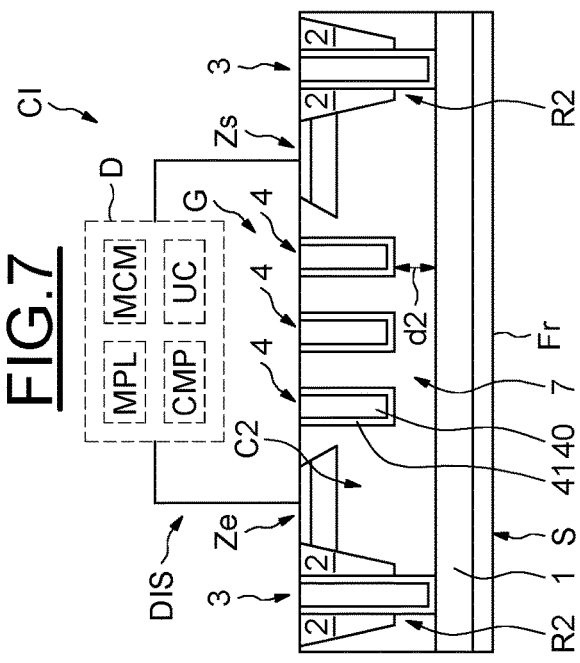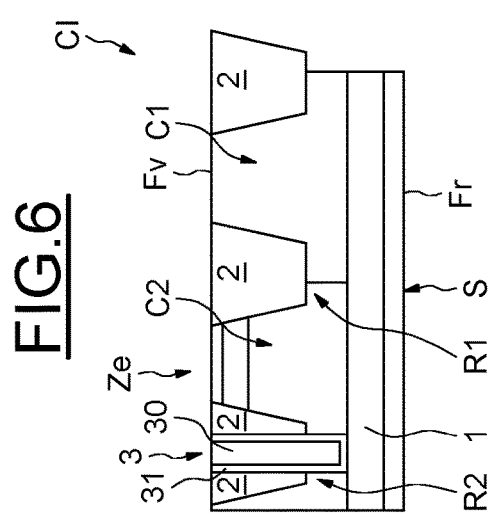

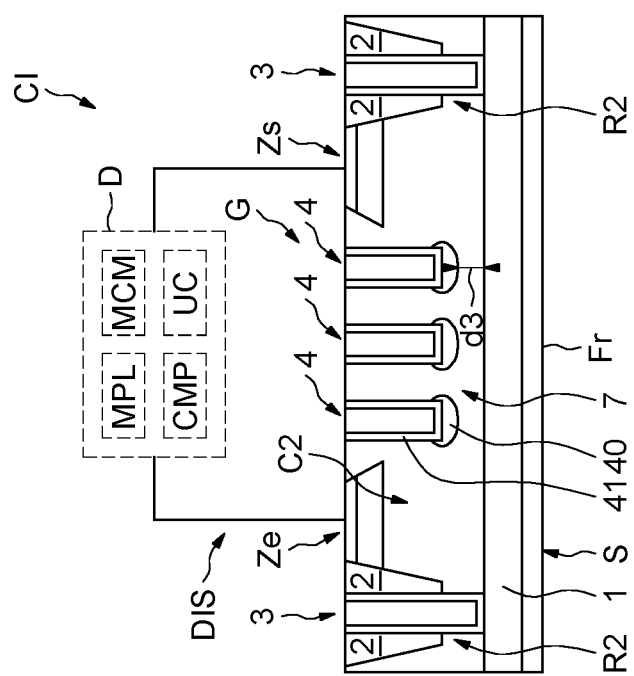

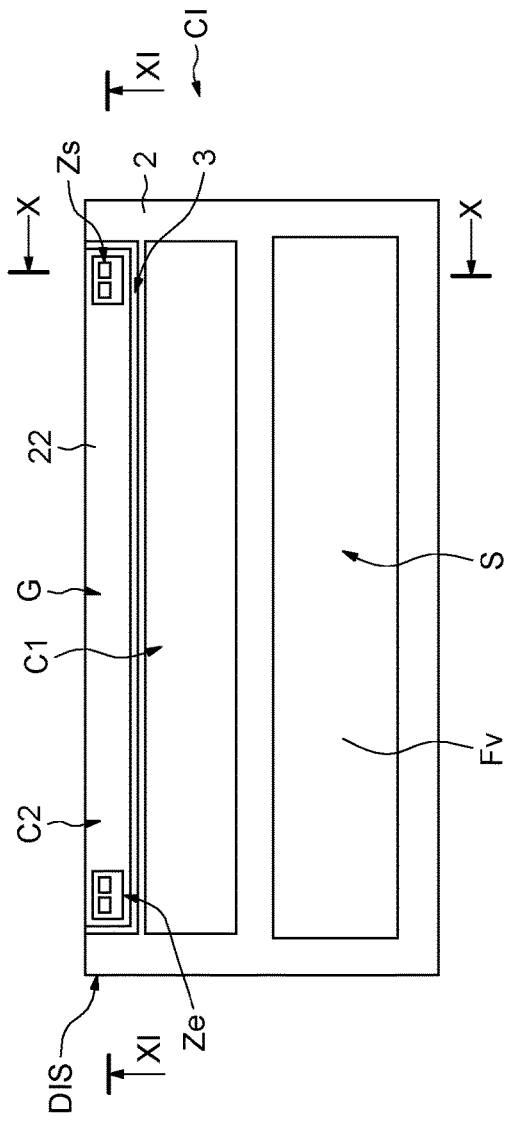
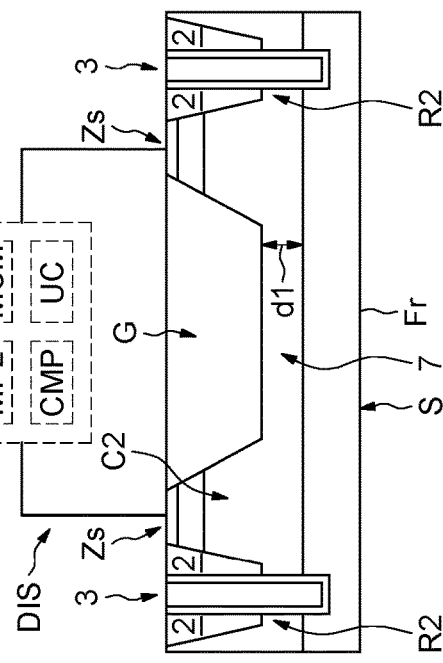
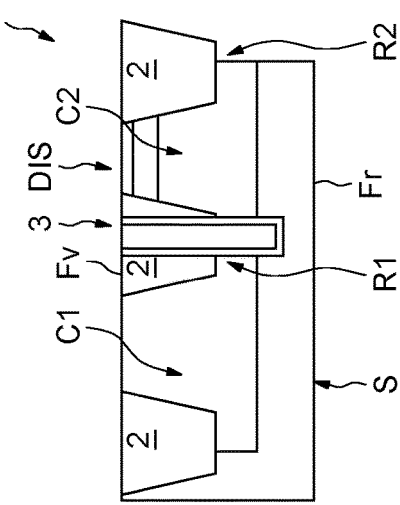

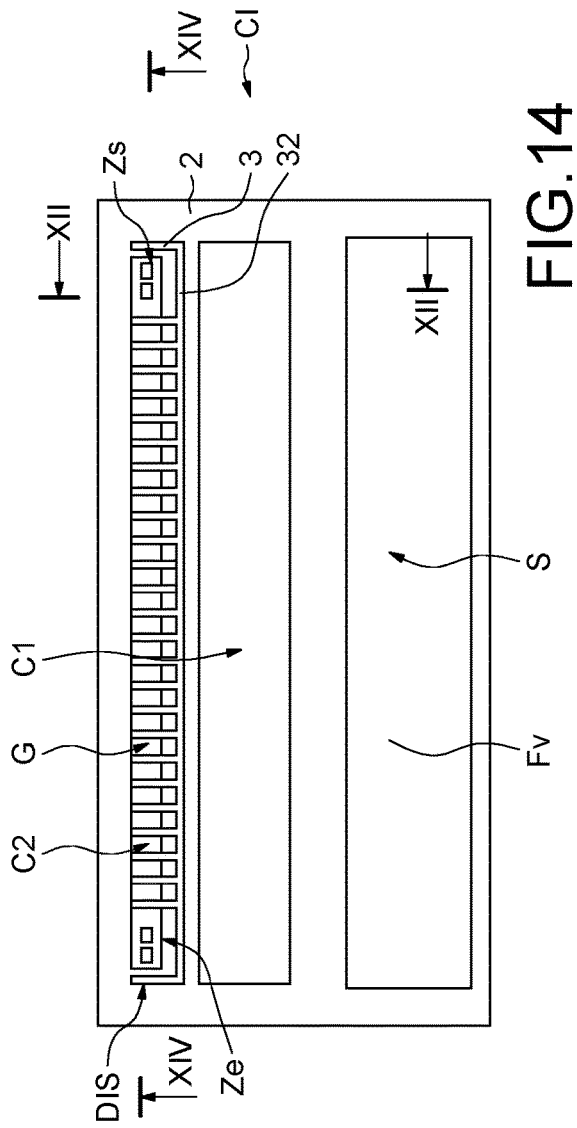
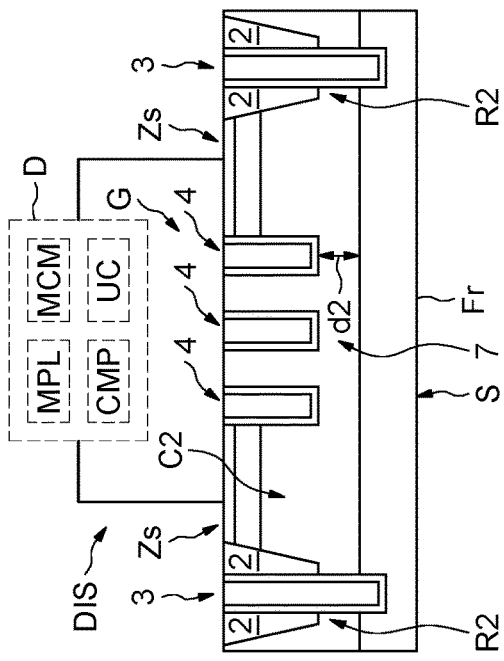
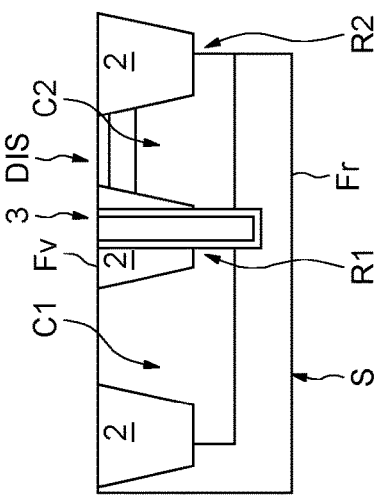

METHOD FOR DETECTING A DIFFERENTIAL FAULT ANALYSIS ATTACK AND A THINNING OF THE SUBSTRATE IN AN INTEGRATED CIRCUIT, AND ASSOCIATED INTEGRATED CIRCUIT

CROSS REFERENCE TO RELATED APPLICATIONS

This application is a continuation of U.S. patent application Ser. No. 16/154,456 filed Oct. 8, 2018, which claims the priority benefit of French Application for Patent No. 1759519, filed on Oct. 11, 2017, the contents of which are hereby incorporated by reference in their entireties to the maximum extent allowable by law.

TECHNICAL FIELD

Various embodiments and their implementation relate to integrated circuits and, more particularly, to the detection of a potential thinning of the substrate of an integrated circuit from its rear face together with the detection of a Differential Fault Analysis (DFA) attack by fault injection.

BACKGROUND

Amongst the possible attacks carried out by fraudsters for extracting confidential data from a memory of an integrated circuit, for example a protected memory of a smartcard, attacks known Differential Fault Analysis (DFA) attacks using fault injection may be mentioned. These attacks aim to interfere with the operation and/or the content of the memory, or else to modify the logical operation of the circuit, for example by means of a type of radiation (laser, infrared, X-rays, etc.) transmitted through the rear face of the chip.

Such a possible attack may thus, for example, be carried out by a beam of focussed ions using a Focussed Ion Beam (FIB) or, for example, by means of a laser beam.

It is therefore particularly useful to seek to protect the electronic circuit against a rear face laser attack.

The effectiveness of such an attack increases when the substrate of the integrated circuit is thinned by the attacker, starting from its rear face, so as to get as close as possible to the components of the integrated circuit, formed on its front face.

There exist means for detecting a thinning of the substrate that allow integrated circuits to be protected against this type of attack.

There exists a need to be able to detect, in a simple manner, both a thinning of the substrate via the rear face and a DFA attack.

SUMMARY

According to one embodiment and its implementation, this need is consequently met with a simple implementation, a reduced surface area, and at the same time offering a protection against the potential interference effects caused by components of the integrated circuit.

According to one aspect, a method is provided for detecting an attack on an integrated circuit comprising a substrate having a rear face, the method comprising: forming in the substrate a first semiconductor well comprising components and at least a second semiconductor well insulated from the first semiconductor well and from the rest of the substrate, detecting a thinning of the substrate via its rear face by a detection of the absence of current flowing in the second well and, in the case of detection of a non-thinning of the substrate, detecting a DFA attack by the detection of the flow of a current flowing in the second well.

According to another aspect, an electronic integrated circuit is provided comprising a semiconductor substrate having a rear face and comprising at least a first semiconductor well comprising components, for example transistors, and at least a second semiconductor well insulated from the first semiconductor well and from the rest of the substrate, the second well comprising a configurable detection device designed, in a first configuration, to detect a thinning of the substrate via its rear face, and in a second configuration, to detect a fault injection for DFA into the integrated circuit.

Thus, a protection of the integrated circuit is implemented by one and the same means against attacks comprising a thinning of the substrate and against DFA attacks by fault injection.

This advantageously allows a gain in surface area with respect to an integrated circuit comprising two separate detection devices.

Furthermore, the formation of the detection device in a second well electrically isolated from the first well comprising components allows it to be protected against interference effects coming from these components and hence obviates the need for any means for disabling components during the detection, and hence allows an additional gain in surface area.

According to one embodiment, the substrate has a front face, opposite to the rear face, and the device comprises: a group of at least a first isolation trench extending in the second well between two locations on the periphery of the second well, from the front face as far as a location situated at a distance from the bottom of the at least a second well, and a detection circuit configured, in the first configuration, to measure a physical quantity representative of the electrical resistance of the second well between two contact areas respectively situated on either side of the group of at least a first trench and, in the second configuration, to detect the presence of an electrical current flowing between the two contact areas.

The detection circuit may comprise: a biasing circuit configured to apply a potential difference between the two contact areas, a comparing circuit configured to measure the current flowing between the two contact areas, and a control circuit configured to initially place the device into a first configuration by enabling the biasing circuit, and for making the device go from the first configuration to a second configuration after a detection of a non-thinning of the substrate while disabling the biasing circuit, the comparing circuit remaining enabled in the first configuration and in the second configuration.

According to one embodiment, the substrate has a first type of conductivity, the first well has a second type of conductivity, and the second well has the first type of conductivity and is insulated from the first well: by a first isolation region comprising at least one isolation trench extending from the front face of the substrate up to a first distance from the bottom of the second well, and by the PN junction between the first well and the second well. The second well is isolated from the rest of the substrate: by a semiconductor layer of the second type of conductivity buried in the substrate under the first well and under the second well, and by a second isolation region comprising the isolation trench, and an additional isolation trench configured so as to provide a continuity of electrical isolation between the isolation trench and the buried semiconductor layer.

According to one embodiment, the substrate has a first type of conductivity, the first well has a second type of conductivity, and the second well has the second type of conductivity and is isolated from the first well by a first isolation region comprising: at least one isolation trench extending from the front face of the substrate up to the first distance from the bottom of the first well, an additional isolation trench configured so as to provide a continuity of electrical isolation between the isolation trench and the bottom of the second well. The second well is isolated from the rest of the substrate: by a second isolation region comprising the at least one isolation trench, and by the PN junction between the second well and the rest of the substrate.

Thus, according to these two embodiments, the second well may optionally have a conductivity of the P type, or a conductivity of the N type.

The group of at least a first trench may comprise an insulating material and extend from the front face of the substrate up to a first distance from the bottom of the second well. Such a first trench may be of the Shallow Trench Isolation (STI) type.

The group of at least a first trench may comprise at least a first trench comprising a central semiconductor region and an insulating envelope which extends transversally within the second well from the front face up to a second distance from the bottom of the well shorter than the first distance.

The first trench may therefore have the aspect of an isolated vertical electrode. This advantageously allows the process of fabrication of isolated vertical electrodes formed elsewhere in the integrated circuit to be re-used, and hence the number of fabrication steps specific to the group of at least a first trench to be reduced.

Furthermore, since these trenches extend more deeply into the substrate, a thinning of the substrate may be detected earlier, and the efficiency of the device is therefore improved.

According to another aspect, an integrated circuit is provided comprising a plurality of first semiconductor wells, each associated with a second semiconductor well comprising a detection device such as previously defined, the devices being coupled in series so as to form a chain of devices electrically coupled in series, the input contact area of the first device of the chain forming a chain input contact area, the output contact area of the last device of the chain forming a chain output contact area, the detection circuit being coupled between the chain input contact area and the chain output contact area.

According to another aspect, a system is provided comprising an integrated circuit such as previously described, where this system may for example be a smartcard.

BRIEF DESCRIPTION OF THE DRAWINGS

Other advantages and features of the invention will become apparent upon examining the detailed description of non-limiting embodiments of the invention, and from the appended drawings in which:

FIGS. 1, 2 and 3 show different views of an integrated circuit;

FIGS. 5, 6 and 7 show different views of an integrated circuit;

FIG. 8 illustrates a modification of the trench structure in FIGS. 5, 6 and 7;

FIGS. 9, 10 and 11 show different views of an integrated circuit;

FIGS. 12, 13 and 14 show different views of an integrated circuit;

DETAILED DESCRIPTION

Figure 4:
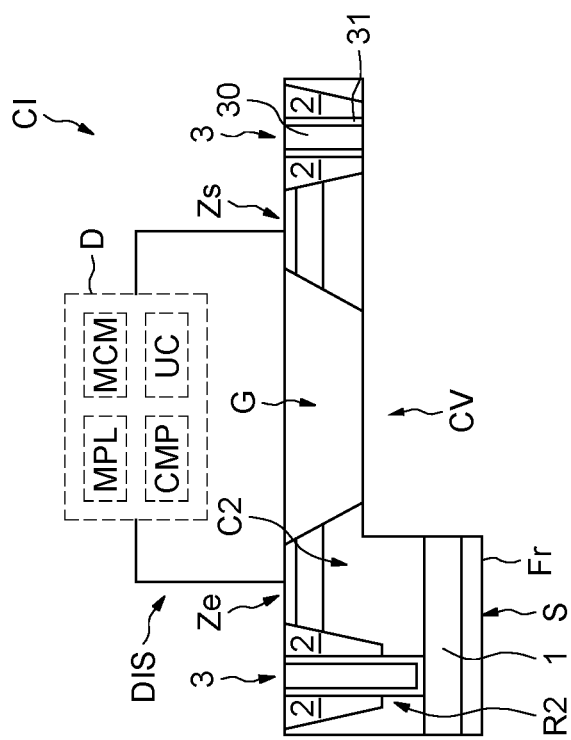
FIG. 4 illustrates a partial thinning of the substrate.

In FIG. 1, where FIG. 2 is a cross-sectional view along the line of cross-section II-II of FIG. 1, and where FIG. 3 is a cross-sectional view along the line of cross-section III-III of FIG. 1, the reference C1 denotes an integrated circuit comprising a semiconductor substrate S in which several semiconductor wells are formed isolated from the rest of the substrate, of which a first well C1 and a second well C2 are shown.

The substrate S has a first type of conductivity, here for example a conductivity of the P type, and the first well C1 has a second type of conductivity, here therefore for example a conductivity of the N type. The second well C2 is of the first type of conductivity, here P.

The first well C1 is electrically isolated from the rest of the substrate by an isolation trench 2, bounding the edges of the first well C1 according to a rectangular shape and extending from the front face Fv of the substrate up to a first distance d1 from the bottom of the first well C1, thus defining a region 7 between the group G of at least a first trench and the bottom of the first well C1 and by the PN junction between the first well and the rest of the substrate.

A buried semiconductor layer 1 of the second type of conductivity, more highly doped than the first well C1, is formed in the substrate, under the first well C1 and under the second well C2.

By way of example, the buried semiconductor layer 1 here has a doping level twice as high as that of the first well C1.

It would however be possible for the buried semiconductor layer 1 to be less highly doped than the first semiconductor well C1, for example half as doped.

The first semiconductor well C1 comprises, for example, a plurality of transistors whose gate lines extend longitudinally over the first well, at least some of which form memory cells, and at least some of which are configured for performing encryption operations.

The second well C2 is next to the first semiconductor well C1.

The second well C2 is isolated from the first well C1 by a first isolation region R1 comprising a first part 21 of the isolation trench 2, and by the PN junction between the second well and the first well, and is isolated from the rest of the substrate by a second isolation region R2, and by the buried semiconductor layer 1.

The second isolation region R2 comprises the first part 21 of the isolation trench 2 which bounds the edges of the second well C2, and an additional isolation trench 3 formed through the first part 21 of the isolation trench, bounding the edges of the second well C2 according to a rectangular shape, and which extends from the front face Fv as far as the buried semiconductor layer 1, in such a manner as to provide a continuity of electrical isolation between the isolation trench 2 and the buried semiconductor layer 1.

The additional isolation trench 3 comprises an insulating wall 31, for example made of silicon oxide, and is filled with a semiconductor material 30, for example here polysilicon.

The additional isolation trench 3 therefore here has the aspect of an isolated vertical electrode. Although it is not used as such, the formation of this electrode is particularly advantageous from the point of view of the fabrication process.

This is because, since the integrated circuit CI comprises memory cells, isolated vertical electrodes used as such are formed within the integrated circuit CI, for example in the first well C1, and allow the selection of the memory cells during the normal operation of the integrated circuit CI.

Thus, forming the additional isolation trench 3 according to the same method of fabrication as the isolated vertical electrodes allows the implementation of a specific fabrication step to be obviated, which would allow for example the formation of additional trenches with a different aspect.

It would furthermore be possible to form a second isolation region R2 comprising only one isolation trench 2 extending more deeply into the substrate, in such a manner as to come into contact with the buried isolation layer. However, the formation of such an isolation trench would require specific fabrication steps.

The integrated circuit CI furthermore comprises a detection device DIS, which allows, in a first configuration, a detection of a thinning of the substrate S via its rear face Fr, and in a second configuration a detection of DFA attack.

The device DIS here is formed in the second well C2, and comprises a group G of at least a first trench, the first trench here comprising the first part 21 of the isolation trench 2 which extends longitudinally within the second well C2 occupying the entire surface area of the second well C2 on the front face Fv of the substrate.

The second well C2 comprises an input contact area Ze, formed at a first end of the part 2 of the trench by conventional doping and silicidation methods, on top of a first cavity passing through the isolation trench 2, and on which is formed an electrical contact.

The second well C2 comprises an output contact area Zs, formed at a second end of the part 2 of the trench by conventional doping and silicidation methods, on top of a second cavity passing through the isolation trench 2, and on which an electrical contact is formed.

Thus, since the isolation trench 2 only extends up to the first distance d1 from the buried semiconductor layer 1, the input contact area Ze and the output contact area Zs are electrically coupled (or connected).

The device DIS furthermore comprises detection circuit D coupled between the input contact area Ze and the output contact area Zs, configured for, in a first configuration, measuring an electrical quantity representative of the electrical resistance of the second well C2, and in a second configuration, detecting a current flowing between the input contact area Ze and the output contact area Zs.

The detection circuit D comprises a control circuit MCM, for example a logical circuit, which allows the detection circuit to be placed in the first configuration or in the second configuration.

Upon initialization of the integrated circuit, the detection circuit D is in the first configuration, then, if no thinning of the substrate is detected, or in other words, if a non-thinning of the substrate is detected, the control circuit MCM switches the detection circuit D into the second configuration and the integrated circuit is enabled according to its normal operation.

In the first configuration, if the substrate S has been thinned beyond the buried semiconductor layer 1, the electrical resistance of the second well will increase in proportion to the decrease in thickness of the region 7 of the second well C2 situated under the isolation trench 2 until it becomes virtually infinite when the thinning has reached the lower end of the isolation trench 2, in other words when the region 7 has been totally thinned.

For this purpose, the detection circuit D may comprise a biasing circuit MPL configured for applying a potential difference between the two contact areas Ze and Zs, for example by applying a positive voltage to the input contact area Ze and by connecting the output contact area Zs to ground. The control circuit D may also comprise a comparing circuit CMP configured for comparing the value of the current flowing between the two contact areas Ze and Zs with a reference value corresponding to the value of the current in the absence of a thinning of the well.

For example, here, the comparing circuit CMP is configured for generating a first value if the value of the current is lower than the reference value, and for generating a second value if the value of the current is higher than or equal to the reference value.

The detection circuit D further comprises a control unit UC for the integrated circuit CI configured for, in this first configuration, upon receiving the first value, resetting or disabling the integrated circuit CI.

If a DFA attack is carried out, conventionally by means of a laser, a photo-current is generated in the second well C2, at the P-N junctions which then behave as photodiodes.

Thus, in this respect, in the second configuration, the control unit UC is configured for resetting the integrated circuit upon receiving the second value, in other words if a current, or photo-current, is detected in the semiconductor well C2.

The control circuit MCM switches the device DIS from the first configuration to the second configuration by disabling the biasing circuit.

The isolation of the second well C2 advantageously prevents any interference of the transistors of the first well C1 with the device DIS, and hence obviates the need to provide a disabling circuit for the transistors of the first well C1.

The absence of the need to implement a disabling circuit advantageously allows a gain in surface area.

FIG. 4 illustrates the integrated circuit CI, in which the substrate has been partially thinned. Following this thinning, the substrate S comprises a cavity Cv, extending from the rear face Fr of the substrate as far as into the second semiconductor well C2, in such a manner as to reach the lower end of the group G of at least a first trench.

The cavity Cv therefore passes through the semiconductor layer 1 and the region 7, and the coupling between the two contact areas Ze and Zs is no longer guaranteed.

By way of example, the cavity extends over a surface area of around twenty-five square micrometers, i.e. a surface area greater than the surface area of the semiconductor layer 1 situated under the first well, which here is around nine square micrometers.

Thus, even if the biasing circuit MPL applies a potential difference between the two contact areas Ze and Zs, no current can flow between the two contact areas Ze and Zs, and the comparing circuit CMP generates the first value.

Upon receiving the first value, the control unit UC resets or disables the integrated circuit CI.

Thus, the integrated circuit CI is protected against the attacks comprising a thinning of the substrate.

FIG. 5, where FIG. 6 is a cross-sectional view along the line of cross-section V-V of FIG. 5, and where FIG. 7 is a cross-sectional view along the line of cross-section VI-VI of FIG. 5, illustrates one variant of the embodiment in relation to FIGS. 1 to 3.

In this embodiment, the first part 21 of the isolation trench does not occupy the entire surface of the second well C2 on the front face Fv, but extends around the periphery of the second well C2 in such a manner as to bound its edges.

Thus, the second well C2 comprises a central part PC in which the group G of at least a first trench comprises a plurality of first trenches 4 extending transversally within the second well C2, from the front face Fv up to a second distance d2 from the bottom of the well, the second distance d2 being shorter than the first distance d1.

The first trenches 4 are formed so as to be parallel to one another and are distributed between the input contact area Ze and the output contact area Zs.

Here, for example, each first trench 4 comprises an insulating wall, for example made of silicon oxide 41, and is filled with a semiconductor material 40, here for example polysilicon.

The first trenches 4 here therefore have the aspect of isolated vertical electrodes, but are not used as such.

The formation of these first trenches 4 advantageously allows a group G of first trenches to be obtained which go more deeply into the substrate, and which therefore allow a more efficient detection of a thinning of the substrate.

This is because, the more deeply the group G of at least one trench goes into the substrate, the less necessary it will be to carry out a significant thinning from the rear face Fr in order to reach the lower ends of the trenches 4, in other words to break through into the region 7, and hence the sooner this thinning will be detected.

It should be noted that it would be possible to form a single isolation trench analogous to that previously described in relation to FIGS. 1 to 3 and which go more deeply into the substrate, but that would require specific fabrication steps.

Thus, for this reason also, the formation of the first trenches 4 allows the process of fabrication of the device DIS to be optimized, and hence the production costs to be reduced.

Furthermore, as illustrated in FIG. 8, it would also be possible to form an implanted region 40 of the N type of conductivity, between the lower end of each first trench 4 and the buried semiconductor layer 1, in such a manner that the implanted region 40 forms an extension of the associated first trench 4, which then extends up to a third distance d3 from the buried isolation layer 1, shorter than the second distance d2.

This allows the efficiency of the device DIS to be further enhanced.

FIG. 9, where FIG. 10 is a cross-sectional view along the line of cross-section IX-IX of FIG. 9, and where FIG. 11 is a cross-sectional view along the line of cross-section X-X of FIG. 9, illustrates one embodiment in which the second well C2 is of the second type of conductivity.

In this embodiment, the device is analogous to the device DIS previously described in relation to FIGS. 1 to 3.

The integrated circuit CI does not comprise the buried semiconductor layer 1, and the second isolation region R2 here comprises a second part 22 of the isolation trench 2, and the second well C2 here is isolated from the rest of the substrate by the second isolation region R2 and by the lateral PN junction between the second well and the rest of the substrate, and the horizontal PN junction between the bottom of the second well C2 and the rest of the substrate.

The first isolation region R1 here comprises a second part 22 of the isolation trench 2 and the additional isolation trench 3, here formed through the second part 22.

The additional trench 3 here extends from the front face Fv to beyond the bottom of the first well C1, into the substrate S, in such a manner as to provide a continuity of electrical isolation between the second part 22 of the isolation trench 2 and the bottom of the second well C2.

FIG. 12, where FIG. 13 is a cross-sectional view along the line of cross-section XII-XII of FIG. 12, and where FIG. 14 is a cross-sectional view along the line of cross-section XIII-XIII of FIG. 12, illustrates an embodiment analogous to the embodiment previously described in relation to FIGS. 5 to 8, in which the first well C1 and the second well C2 are of the second type of conductivity.

In this embodiment, the second part 22 of the isolation trench 2 does not occupy the entire surface of the second well C2 on the front face Fv, but extends around the periphery of the second well C2 in such a manner as to bound its edges.

Thus, the second well C2 comprises a central part PC in which the group G of at least a first trench comprises a plurality of first trenches 4 extending transversally within the second well C2, from the front face Fv up to the second distance d2 from the bottom of the well.

In this embodiment, the first isolation region R1 here comprises the second part 22 of the isolation trench 2 and the additional isolation trench 3, here formed through the second part 22.

Figure 15:
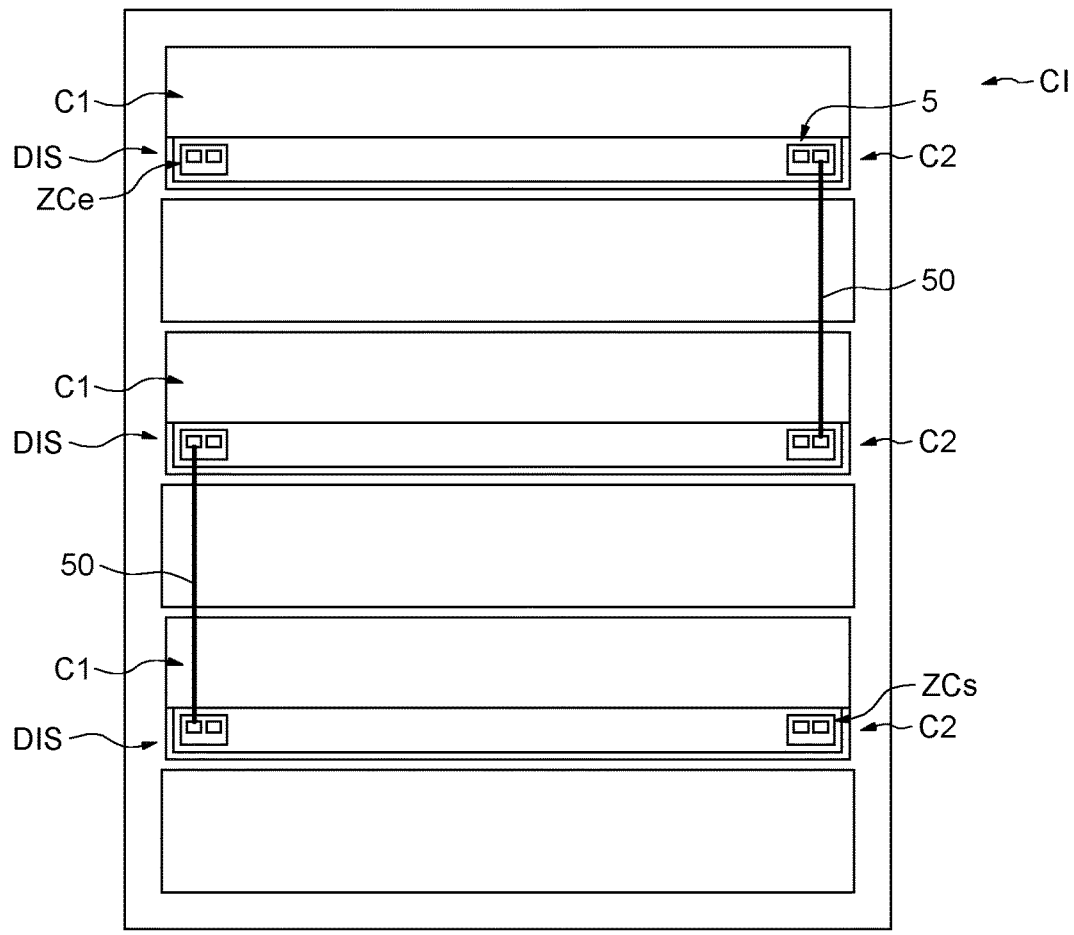
FIG. 15 shows an alternative implementation for the semiconductor wells.

FIG. 15 illustrates an integrated circuit CI comprising a plurality of first wells C1, within and on which several transistors are formed, each first semiconductor well C1 being associated with a second well C2 comprising a device DIS according to any one of the embodiments previously described in relation to FIGS. 1 to 14.

In this embodiment, the detection devices DIS are coupled in series so as to form a chain 5 of devices electrically coupled in series.

In FIG. 15, the connections 50 between the devices are shown schematically, but they are in practice conventionally formed by metal tracks and vias formed in the interconnection part of the integrated circuit CI.

The input contact area of the first device DIS of the chain here forms an input contact area ZCe for the chain of devices, and the output contact area of the last device of the chain here forms an output contact area ZCs for the chain of devices.

Thus, the detection circuit D here is coupled between the input contact area ZCe of the chain of devices and the output contact area ZCs of the chain of devices, and is hence common to all the devices of the chain. This advantageously allows a space gain in the integrated circuit CI.

In this embodiment, the chain may comprise any given number of devices according to embodiments which may be different, from amongst those previously described in relation to FIGS. 1 to 13.

Figure 16:
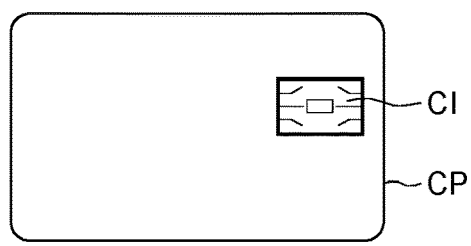
FIG. 16 schematically shows a smart card which can incorporate the circuits of FIGS. 1-15.

An integrated circuit CI such as previously described in relation to FIGS. 1 to 15 may be incorporated into any type of object, notably a smartcard CP, as illustrated schematically in FIG. 16.

The invention claimed is:

1. An integrated circuit, comprising:
   a semiconductor substrate having a rear face and a front face opposite to said rear face;
   a first semiconductor well in the semiconductor substrate;

a second semiconductor well in the semiconductor substrate, the second semiconductor well insulated from the first semiconductor well and from a rest of the semiconductor substrate;

wherein the second semiconductor well includes a PN junction; and a detecting device configured to operate to detect a Differential Fault Analysis (DFA) attack initiated by application of a laser radiation to the semiconductor substrate through detection of a photocurrent flowing in the second semiconductor well, wherein said photocurrent is generate by said PN junction in response to the laser radiation;

wherein the detecting device comprises:
    a first isolation trench extending into the second semiconductor well between two locations on a periphery of the second semiconductor well, said first isolation trench having a depth from the front face that is separated by a distance from a bottom of the second semiconductor well;
    two contact areas respectively situated on opposite sides of the first trench; and
    a detection circuit operating to detect the presence of said photocurrent flowing at one or more of the two contact areas.

2. The integrated circuit according to claim 1, wherein the semiconductor substrate has a first type of conductivity, the first semiconductor well has a second type of conductivity, and the second semiconductor well has the first type of conductivity.

3. The integrated circuit according to claim 2, wherein the second semiconductor well is isolated from the first semiconductor well by a first isolation region comprising at least one isolation trench extending from the front face of the semiconductor substrate up to a first distance from the bottom of the second semiconductor well; and by the PN junction which is formed by the first semiconductor well and the second semiconductor well.

4. The integrated circuit according to claim 3, wherein the second semiconductor well is isolated from the rest of the semiconductor substrate by a semiconductor layer of the second type of conductivity buried in the semiconductor substrate under the first semiconductor well and under the second semiconductor well.

5. The integrated circuit according to claim 4, wherein the second semiconductor well is further isolated from the rest of the semiconductor substrate by a second isolation region comprising: the at least one isolation trench; and an additional isolation trench configured for providing a continuity of electrical isolation between the isolation trench and the buried semiconductor layer.

6. The integrated circuit according to claim 1, wherein the semiconductor substrate has a first type of conductivity, the first semiconductor well has a second type of conductivity, and the second semiconductor well has the second type of conductivity.

7. The integrated circuit according to claim 6, wherein the second semiconductor well is isolated from the first semiconductor well by a first isolation region comprising: at least one isolation trench extending from the front face of the semiconductor substrate up to a first distance from the bottom of the second semiconductor well; and an additional isolation trench configured for providing a continuity of electrical isolation between the isolation trench and the bottom of the second semiconductor well.

8. The integrated circuit according to claim 7, wherein the second semiconductor well is isolated from the rest of the semiconductor substrate by a second isolation region comprising the at least one isolation trench.

9. The integrated circuit according to claim 8, wherein the second semiconductor well is further isolated from the rest of the semiconductor substrate by a further PN junction between the second semiconductor well and the rest of the semiconductor substrate.

10. The integrated circuit according to claim 1, wherein the first isolation trench comprises a trench filled with an insulating material.

11. The integrated circuit according to claim 1, wherein the first isolation trench comprises a trench with a central semiconductor region and an insulating envelope, said trench extending transversally within the second semiconductor well.

12. The integrated circuit according to claim 1, further comprising circuit components in the first semiconductor well.

13. An integrated circuit, comprising:
a semiconductor substrate having a rear face;
a first semiconductor well in the semiconductor substrate;
a second semiconductor well in the semiconductor substrate, the second semiconductor well insulated from the first semiconductor well and from a rest of the semiconductor substrate;
wherein the second semiconductor well includes a PN junction;
a detecting device configured to operate to detect a Differential Fault Analysis (DFA) attack initiated by application of a laser radiation to the semiconductor substrate through detection of a photocurrent flowing in the second semiconductor well, wherein said photocurrent is generate by said PN junction in response to the laser radiation; and
circuit components in the first semiconductor well;
wherein the circuit components are memory circuits.

14. The integrated circuit according to claim 13, wherein the memory circuits are components of a smartcard.

15. The integrated circuit according to claim 13, wherein the semiconductor substrate has a first type of conductivity, the first semiconductor well has a second type of conductivity, and the second semiconductor well has the first type of conductivity.

16. The integrated circuit according to claim 13, wherein the semiconductor substrate has a first type of conductivity, the first semiconductor well has a second type of conductivity, and the second semiconductor well has the second type of conductivity.

17. The integrated circuit according to claim 13, wherein the second semiconductor well is isolated from the first semiconductor well by a first isolation region comprising at least one isolation trench extending from the front face of the semiconductor substrate up to a first distance from the bottom of the second semiconductor well.

18. The integrated circuit according to claim 13, wherein the second semiconductor well is isolated from the first semiconductor well by the PN junction which is formed by the first semiconductor well and the second semiconductor well.

* * * * *